United States Patent
Wang et al.

(10) Patent No.: US 6,445,087 B1
(45) Date of Patent: Sep. 3, 2002

(54) NETWORKING POWER PLUG DEVICE WITH AUTOMATED POWER OUTLET CONTROL

(75) Inventors: Jong-Ding Wang; Chih-Hao Pan, both of Taipei (TW)

(73) Assignee: Primax Electronics Ltd., Taipei (TW)

( * ) Notice: Subject to any disclaimer, the term of this patent is extended or adjusted under 35 U.S.C. 154(b) by 96 days.

(21) Appl. No.: 09/637,109

(22) Filed: Aug. 11, 2000

(30) Foreign Application Priority Data

Jun. 23, 2000 (TW) ............................................ 89112369

(51) Int. Cl.[7] .................................................. H02J 1/00

(52) U.S. Cl. .............................. 307/40; 307/38; 307/39; 307/85; 307/140; 307/139

(58) Field of Search ............................ 340/825.72, 635, 340/652; 307/40, 38, 39, 41, 139, 140, 85

(56) References Cited

U.S. PATENT DOCUMENTS

| | | | | |
|---|---|---|---|---|
| 3,909,821 A | * | 9/1975 | Jagoda et al. | 340/310 R |
| 5,359,540 A | * | 10/1994 | Ortiz | 364/492 |
| 5,689,242 A | * | 11/1997 | Sims et al. | 340/652 |

* cited by examiner

Primary Examiner—Brian Sircus
Assistant Examiner—Robert L. Deberadinis
(74) Attorney, Agent, or Firm—Winston Hsu

(57) ABSTRACT

A power plug device has a power plug, at least one switched power socket at least one socket switch, a embedded controller and a telephone jack. The embedded controller can send and receive network signals across a telephone line through the telephone jack, or across a power line through the power plug of the power plug device. The power plug device may switch on or off its power sockets depending on networking signals that come from the power or telephone lines. The power plug device can also send networking signals out along the telephone or power line. The power plug device also has a networking communications port. Two such power plug devices enable two or more computers to communicate with each other using the existing power and telephone lines within a building.

5 Claims, 4 Drawing Sheets

NETWORKING POWER PLUG DEVICE WITH AUTOMATED POWER OUTLET CONTROL

BACKGROUND OF THE INVENTION

1. Field of the Invention

The present invention relates to a power plug device. More specifically, the present invention relates to a power plug device that enables local networking over telephone or power lines and that has power sockets that can be controlled via this local network.

2. Description of the Prior Art

Computers have become increasingly ubiquitous in almost all aspects of life, from home to office. With this has grown the trend of linking computers together to form a network. Typically, this involves installing networking circuitry in the computers and running networking cable to physically connect the machines together. Enabling the computers themselves for networking capabilities is relatively straightforward. Indeed, many personal computers come from the factory with the ability already built into them. Unfortunately, establishing the actual physical link can be quite a bit more complicated and expensive. In its simplest form, this may involve laying cable across the floor, which is not only aesthetically displeasing but may also lead to tripping and snagging. More elaborate methods call for installing the cable behind existing walls, which is an expensive proposition.

Another trend with increasing computerization is linking relatively simple devices to a computer to control their function. Using a computer to turn on appliances like lights and coffee pots is one such example. Implementing this scheme requires, a gain, a network of some sort to enable communications and control between the computer and the devices. Line-based networks suffer from the problems mentioned above, i.e., installing the cable. Wireless networks have also been proposed, such as infrared and radio wave technologies. These technologies are well developed, but each has certain inconveniences. Infrared communications require a line of sight orientation between the two communicating devices. Radio communications can suffer from electronic interference from other devices, or physical interference from walls, metal shields, etc.

SUMMARY OF THE INVENTION

It is therefore a primary objective of this invention to provide a power plug device that uses already-existing telephone or power lines to provide network communications, and which has functionality that enables a remote device on the network to switch the power sockets of the power plug device on and off.

The present invention, briefly summarized, calls for a power plug device with at least one switched power socket and a telephone jack. The power plug device has an embedded controller that enables it to send and receive network signals across a telephone line through a the telephone jack, or across a power line through the power plug of the power plug device. The power plug device may switch on or off its power socket depending on networking signals that come from the power or telephone lines. The power plug device can also send networking signals out along the telephone or power line. With an added networking communications port, two such power plug devices enable two or more computers to communicate with each other using the existing power and telephone lines within a building.

By using the existing power and telephone lines within a building, the present invention permits easy local networking connectivity between computers. With its remote switching abilities, a computer on the local network can turn simple appliances on or off, or even control the operations of more complicated, network-enabled devices.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
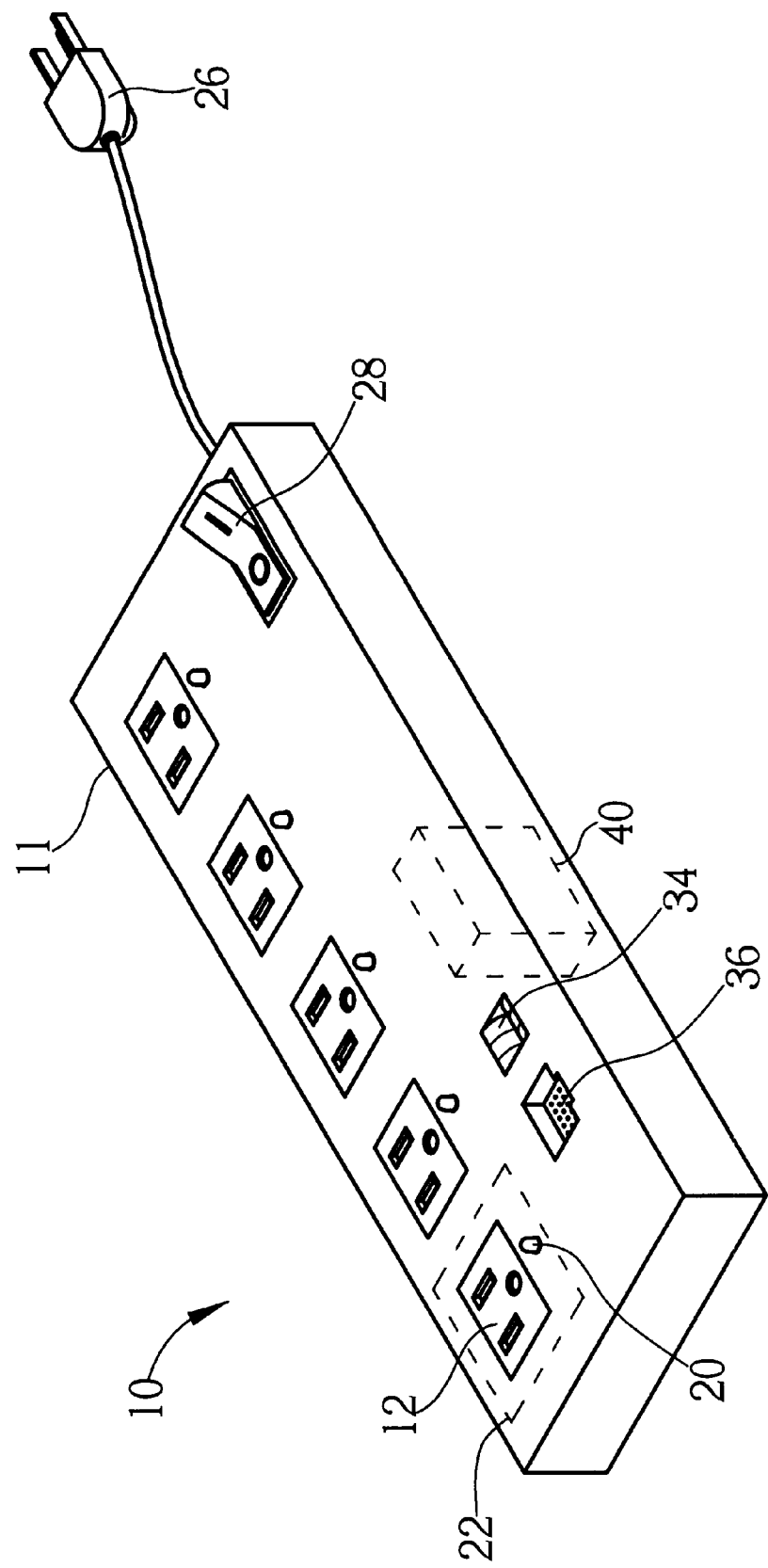
FIG. 1 is a perspective view of a present invention power plug device.

Please refer to FIG. 1. FIG. 1 is a perspective view of a present invention power plug device 10. In a preferred embodiment, the power plug device 10 comprises a housing 11, a power plug 26 connected on the housing 11 for obtaining electrical power from a power source (not shown), a plurality of power sockets 12 connected with the power plug 26 via a power switch 28, for supplying power to an external device, such as a computer, printer, scanner, etc. The power switch 28 is manually switchable and determines whether the incoming power from the power plug 26 can be supplied to other components of the power plug device 10. On the housing 11, there is a communications port 36, for example a RJ 45 network jack, for receiving controlling or communications signals from computers. Whenever necessary, a RJ 11 telephone jack 34 can be accommodated so as to allow normal telephone lines to plug in.

Figure 2:
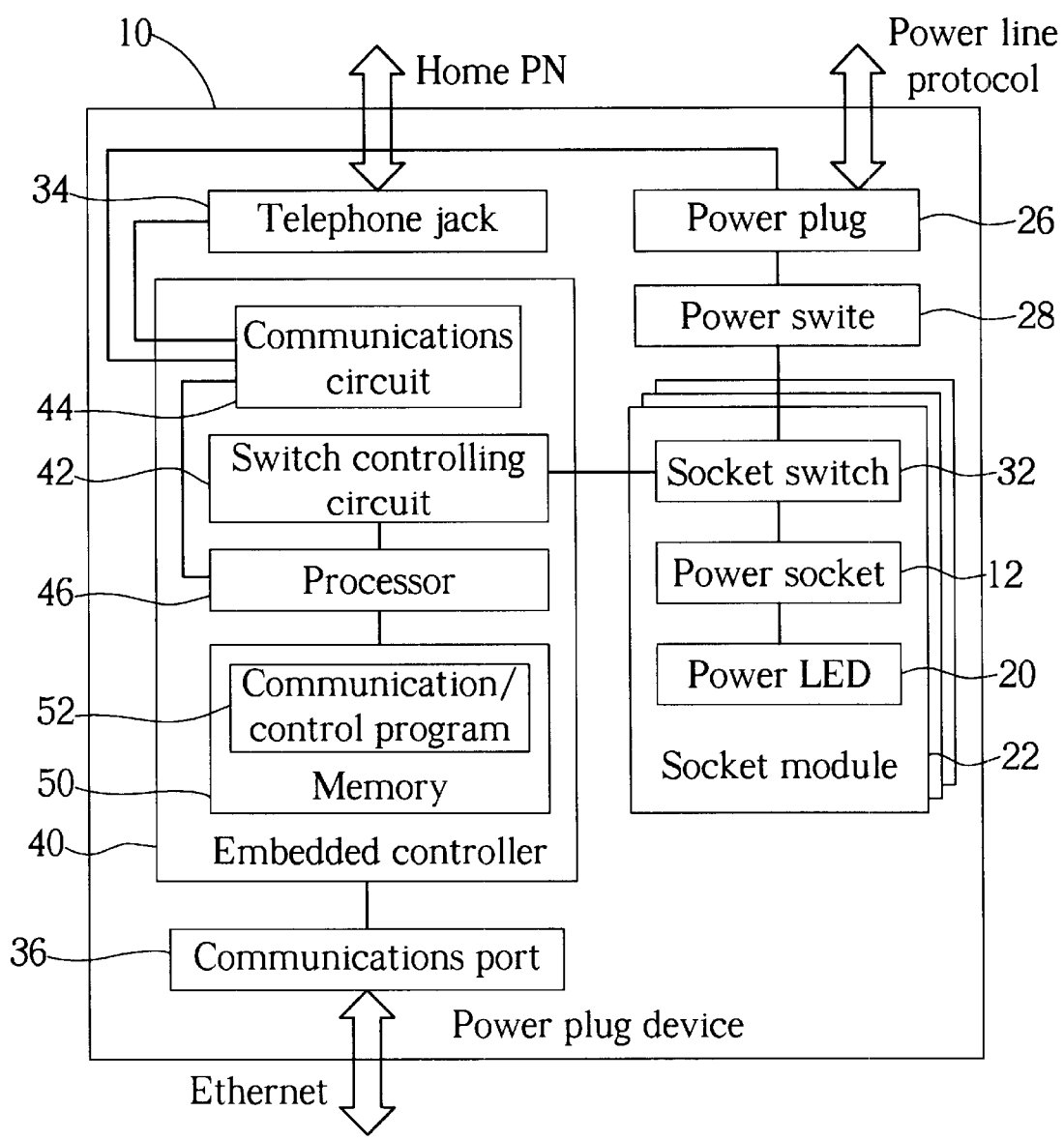
FIG. 2 is a functional block diagram of the power plug device shown in FIG. 1.

Please refer to FIG. 2. FIG. 2 is a functional block diagram of the power plug device 10. The power plug device 10 comprises the power plug 26, the power switch 28, a plurality of socket modules 22, the embedded controller 40, the communications port 36 and the telephone jack 34. Each socket module 22 comprises a socket switch 32, a power socket 12 and a power LED 20. The embedded controller 40 comprises a switch controlling circuit 42, a communications circuit 44, a processor 46 and a memory 50 wherein a communication/control program 52 is stored.

The power plug 26 obtains electrical power or accompanying communications signals from an outside power source, and transmits obtained power or signals to the power plug device 10. Power from the power plug 26 is transmitted, via the power switch 28, to each socket module 22 and the external device plugged on the power socket 12. When the socket switch 32 of a socket module 22 is switched off, power can not be transmitted to the corresponding power socket 12. At this time, the power LED 20 of this socket module 22 is off, so as to indicate the user the present state of the power socket 12.

The power plug device 10 also comprises the embedded controller 40. The socket switch 32 of the socket module 22 is electrically connected to embedded controller 40, so that the embedded controller 40 can control the on/off states of the socket switch 32. The embedded controller 40 is electrically connected with the power plug 26, the socket switch 32, the telephone jack 34 and the communications port 36. The embedded controller 40 comprises a switch controlling circuit 42 to control the on/off states of the socket switch 32 in each socket module 22, a communications circuit 44 for receiving communications signals from the power plug 26 or the telephone jack 34, a processor 46 electrically connected to the communications circuit 44 and to the switch controlling circuit 42, and a memory 50 electrically connected to the processor 46. Inside the memory 50, a communication/control program 52 is stored to control operation of each component in the embedded controller 40.

To date, various methods have been proposed to create a local area network (LAN) from the existing wiring inside a building, such as an office or a residence. Specifically, most rooms have access to either a telephone jack, and, almost certainly, a power socket. As both the telephone jack and the power socket are electrically connected to other such outlets within the building, it became clear to many that these points were a resource upon which a LAN could be built. For technical problems related to signal noise on power lines, use of telephone lines currently has the broadest support in the industry. Specifically, a standard, homePN, has been developed by a consortium of manufacturers. The specifications of homePN are publicly available, and can be had from many sources, www.homepna.org in particular. Power line networking also exists and is available on the common market. Ambient Technologies Inc., of Fremont, Calif., for example, has announced a product release for chips that provide power line networking.

The power plug device 10 also comprises a communications port 36, which is electrically connected to the communications circuit 44 of the embedded controller 40. The communications circuit 44 of the power plug device 10 provides circuitry that enables it to both receive and transmit communications signals across telephone lines and power lines. In the preferred embodiment, the homePN networking protocol standard is used for network transactions across telephone lines, i.e., through the telephone jack 34.

The communications port 36 is used to electrically connect to a corresponding port on a networking device, such as a personal computer. In the preferred embodiment, the communications port is an RJ45 Ethernet port. Consequently, communications to and from the communications port 36 utilize the Ethernet communications protocol. Communication signals coming across the plug 26, or the telephone jack 34, are relayed to the communications circuit 44. As such signals come across a different hardware layer, they will be using a communications protocol that differs from the Ethernet standard. For example, signals to and from the telephone jack 34 will use the homePN (home phone network) networking protocol. Consequently, to relay signals from the telephone jack 34 to the communications port 36, the communications circuit converts signals from a second protocol, such as homePN, to a first protocol, such as Ethernet. A similar conversion is performed for signals coming from the power plug 26.

Conversely, signals coming from the communications port 36 using the first protocol, i.e., Ethernet, must be converted into the second protocol, such as homePN, by the communications circuit 44 before they are relayed on to the telephone jack 34, or the power plug 26. Hence, the communications circuit 44 provides conversion abilities between first and second communications protocols.

The communication/control program 52, in conjunction with the communications circuit 44, monitors the communications traffic on the communications port 36, the power plug 26, and the telephone jack 34. Certain communication signals can be targeted specifically to a power socket 12 of the power plug device 10. These signals are used to set the state of their corresponding socket switches 32. When the communication/control program 52 recognizes such a signal, it directs the switch controlling circuit 42 to set the power socket 12 to an appropriate state, i.e., on or off as directed by the signal, by setting the state of the appropriate socket switch 32. Conversely, a signal can be sent that requests the current state of a socket switch 32. In this case, the communication/control program 52 instructs the communications circuit 44 to a send a signal along the appropriate path, i.e., the power plug 26, the telephone jack 34 or the communications port 36, that indicates the current state of the requested power socket 12.

Figure 3:
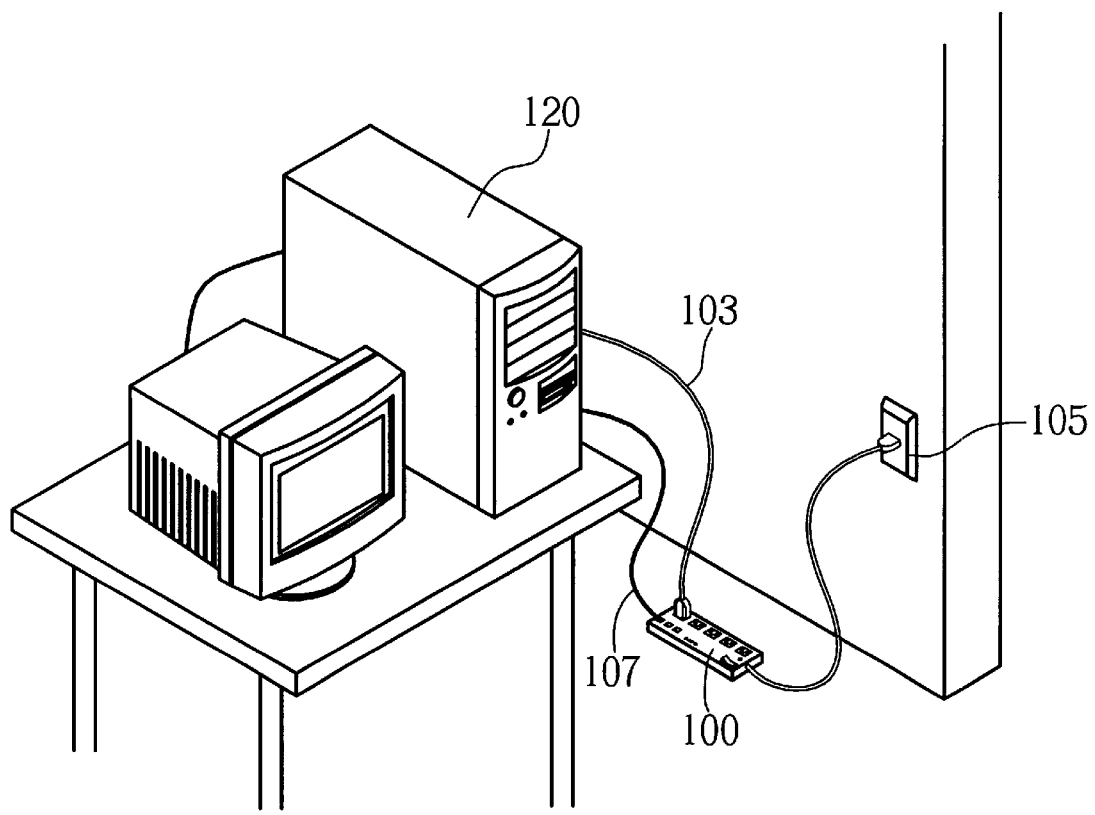
FIG. 3 is a perspective view of an example control configuration using the present invention.
Figure 3:
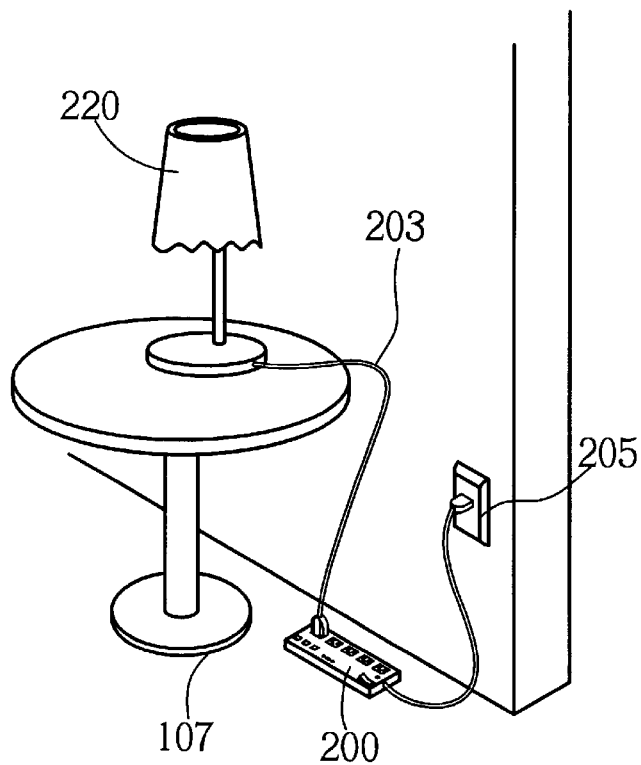

As an example of device control and communications functionality of the present invention, please refer to FIG. 3. FIG. 3 is a perspective view of an example control configuration using a present invention power plug device 100 for supplying power and communications to a computer, and using another present invention power plug device 200 to provide power and control functionality to a common house lamp 220.

The computer 120 comprises a large amount of complicated circuitry. In particular, it comprises an Ethernet networking card (not shown), with an RJ45 socket. Using an RJ45 network cable 107, the computer electrically connects the networking card with the power plug device 100, using the RJ45 communications port on the power plug device 100. The lamp 220 comprises a light bulb (not shown) to provide light when the lamp has electrical power.

The power plug device 100 obtains electrical power from an outlet 105. The power plug device 200 obtains electrical power from an outlet 205. Both the outlet 105 and the outlet 205 are part of the same household circuit, and so are electrically connected with each other. In this manner, the communications circuit of the power plug device 100 can establish communications with the respective circuit within the power plug device 200. The computer 120 obtains surge protected power from the power plug device 100 via its power cable 103, which is plugged into a power socket of the power plug device 103. The lamp obtains surge protected from a power socket of the power plug device 200 through its cable 203.

A program running on the computer 120 decides that it's time to turn on the lamp 220. It sends a control signal for the power socket of the lamp out from the communications card, down the RJ45 cable 107 to the power plug device 100. The communication/control program within the power plug device 100 recognizes that this control signal is not for any of its power sockets, and so converts the control signal from an Ethernet protocol to one suitable for a power line. The converted control signal is sent out of the plug of the power plug device 100 and into the outlet 105. The signal then travels to the outlet 205 and into the power plug device 200. The communication/control program of the power plug device 200 recognizes the signal as a control command for one of its power sockets. It directs its switch controlling circuit to turn on the appropriate socket switch Power is thus provided to the lamp 220, turning on the bulb and lighting the room.

In a similar manner, the computer 120 can determine the state of the socket switch for the socket into which the lamp 220 is plugged. The computer 120 sends and appropriate message to the power plug device 200 in the manner described above. The power plug device 200 then composes a reply that indicates the state of the socket switch, and hence the state of the lamp 220, and by the reverse route sends this message to the computer 120.

Figure 4:
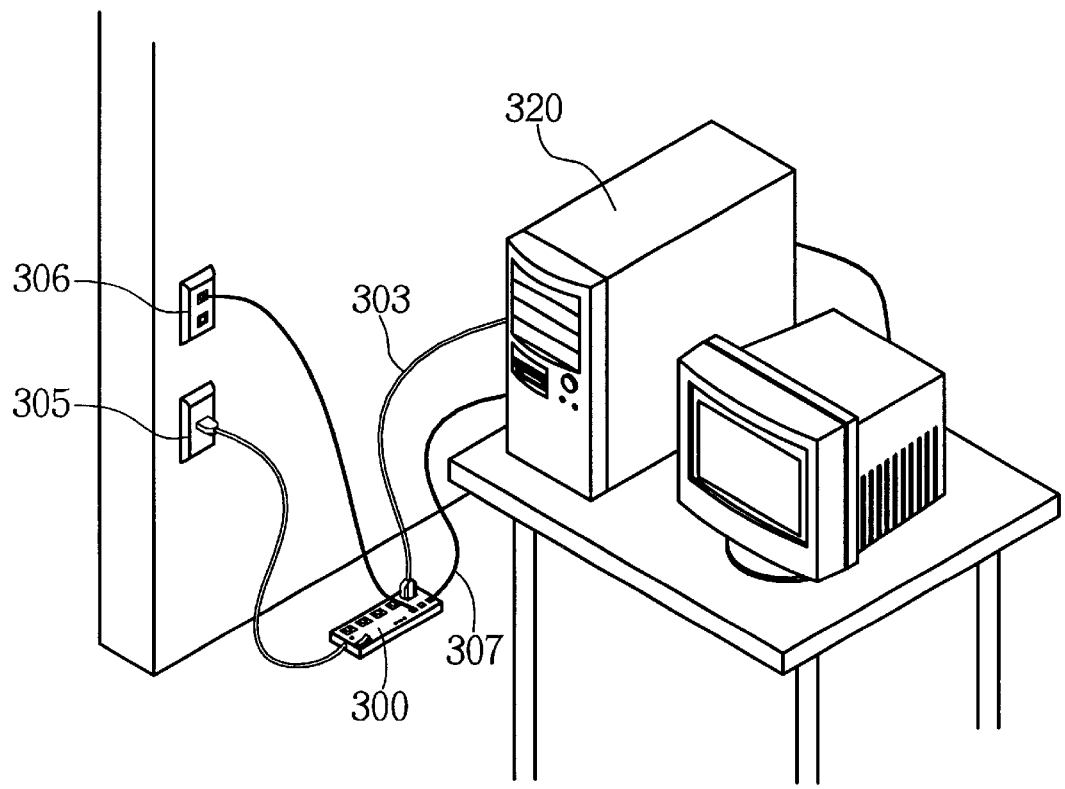
FIG. 4 is a perspective view of an example network configuration using the present invention.
Figure 4:
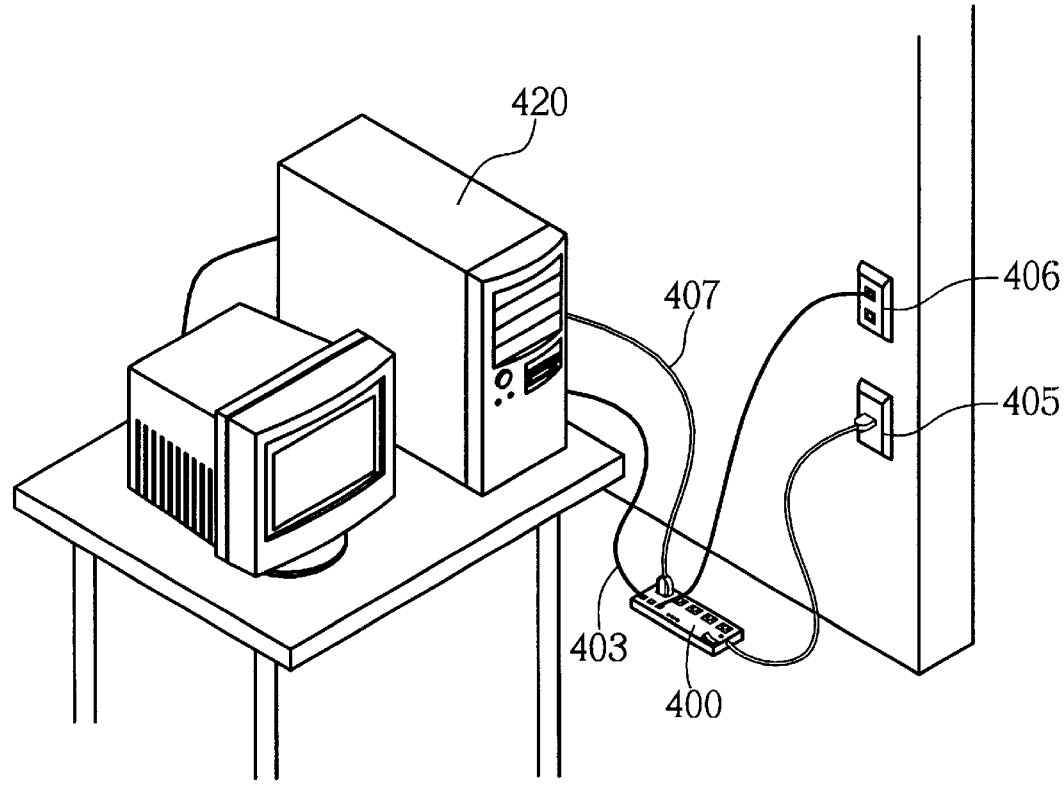

Please refer to FIG. 4. FIG. 4 is a perspective view of an example LAN configuration using present invention power plug devices 300 and 400. A network-enabled computer 320 obtains surge protected power from a power socket of the power plug device 300 through a power cable 303. The computer 320 also establishes a network link to the power plug device 300 using an RJ45 network cable 307. The power plug device 300 obtains electrical power from an outlet 305, and is also electrically connected to a telephone jack 306, using an RJ11 telephone cable.

In another room of the same building, a network-enabled computer 420 obtains surge protected power through its power cable 403 from a power socket of the power plug device 400. The computer 420 establishes a network connection with the power plug device 400 via an RJ45 cable. The power plug device 400 obtains power from an outlet 405, and is also electrically connected to a telephone jack 406.

Using this configuration, the power plug devices 300 and 400 can establish network communications with each other through the telephone jacks 406 and 306, as well as through the power outlets 305 and 405. For the following example, the use of the telephone jacks will be considered, though, as previously shown, the power outlets could also be used.

The computer 320 is to send a message to the computer 420. The computer 320 composes data which is passed to its network card (not shown). The network card transforms the data into an Ethernet signal, which is sent out onto the RJ45 cable 307. The signal is received by the communications circuit of the power plug device 300 via its communication port. The communication/control program within the power plug device notes that the message is intended for none of its power sockets, and so converts it into an appropriate homePN signal. This homePN signal is then sent out through the first telephone jack of the power plug device 300, where it goes into the telephone jack 306 of the building. This jack, being on the same circuit, is electrically connected to the telephone jack 406. In this manner, the homePN signal is delivered to the first telephone jack of the power plug device 400. The communication/control program of the power plug device 400 realizes that the signal is not intended for any of its power sockets, and so converts the homePN signal into an Ethernet signal. This Ethernet signal is sent out of the communications port of the power plug device 400, along the RJ45 cable 407, and into the network card of the computer 420. Hence, as far as the computers 320 and 420 are concerned, an Ethernet connection exists between them.

It is important to note, here, that in the above configuration, the power plug devices can use both the power lines and telephone lines already existent in the building to establish a communications connection. Consequently, the power plug devices may opt, at times, to use one line over the other; using, for example, the telephone lines over the power lines. Consequently, the total potential bandwidth of the above system is greater than a single telephone or power line connection alone. This could prove to be beneficial on networks that experience heavy loading.

Please refer back to FIG. 2. In an alternative embodiment of the present invention, the power plug device 10 does not have the communications port 36. This device is used for controlling power to non-network enabled devices, such as the lamp 220 of FIG. 3. The design of the alternative embodiment is simplified as no communications protocol conversions need to be done, and the circuitry associated with the Ethernet communications port is eliminated.

Numerous configurations of the present invention are possible, such as linking a computer to a network-enabled printer via the power lines of a building, etc. The examples given above are meant only to demonstrate only the key aspects of the functionality of the present invention. The examples should not imply any limits on the range of possible uses to which the present invention may be applied.

Those skilled in the art will readily observe that numerous modifications and alterations of the device may be made while retaining the teachings of the invention. Accordingly, the above disclosure should be understood to be limited only by the bounds of the following claims.

What is claimed is:

1. A power plug device comprising:

a housing;

a power plug connected on the housing for obtaining electrical power and for sending and receiving communications signals therein of a first communications protocol type;

a communications port for establishing a connection to a computer network, the communications port capable of sending and receiving communications signals of a second communications protocol type;

a telephone jack for establishing a connection to a telephone network, the telephone jack capable of sending and receiving communications signals of a third communications protocol type;

at least one power socket module comprising a socket switch and a power socket, wherein the power socket is electrically connected to the power plug via the socket switch and provides electrical power to a plugged external device, an on/off state of the socket switch determining whether or not the power socket provides electrical power to the external device; and an embedded controller electrically connected to the power plug, the communications port, the telephone jack and the socket switch, the embedded controller comprising:

a switch controlling circuit that controls the on/off state of the socket switch;

a communications circuit for receiving communications signals from and sending communications signals to the power plug, the telephone jack and the communications port;

a processor electrically connected to the communications circuit and to the switch controlling circuit; and a memory electrically connected to the processor, the memory comprising a communication/control program that controls operations of the embedded controller, providing the embedded controller conversion capabilities between the first, second and third communications protocol types to enable the communications circuit to relay communications signals between the power plug, telephone jack and communications port, and providing switching capabilities to direct the switch controlling circuit to control the on/off state of the socket switch according to communications signals received from the communications circuit.

2. The power plug device of claim 1 wherein the third communications protocol type is a homePN (home phone network) communications protocol.

3. The power plug device of claim 1 wherein the communication/control program father provides functionality to send out communications signals through the communications circuit to the power plug, phone jack or communications port that indicate the on/off state of the socket switch.

4. The power plug device of claim 1 wherein the second communications protocol type is an Ethernet communications protocol.

5. The power plug device of claim 1 wherein the communications port is adapted to accommodate an RJ 45 network jack.

* * * * *